(12) United States Patent
Wilson

(10) Patent No.: US 7,178,436 B2
(45) Date of Patent: Feb. 20, 2007

(54) METHOD OF CUTTING CARBON AND ALLOY STEEL

(75) Inventor: David N. Wilson, Warrior, AL (US)

(73) Assignee: United States Steel Corporation, Pittsburgh, PA (US)

( * ) Notice: Subject to any disclaimer, the term of this patent is extended or adjusted under 35 U.S.C. 154(b) by 3 days.

(21) Appl. No.: 10/703,264

(22) Filed: Nov. 7, 2003

(65) Prior Publication Data

US 2005/0109176 A1    May 26, 2005

(51) Int. Cl.
*B26D 45/04*    (2006.01)

(52) U.S. Cl. .............................. 83/62.1; 83/74; 83/490

(58) Field of Classification Search ............... 83/62.1, 83/74, 490
See application file for complete search history.

(56) References Cited

U.S. PATENT DOCUMENTS

| | | | | |
|---|---|---|---|---|
| 3,656,261 | A | * | 4/1972 | Everett ..................... 451/28 |
| 3,715,946 | A | * | 2/1973 | Kaltenbach ................ 83/72 |
| 3,738,208 | A | | 6/1973 | Hartzell |
| 3,789,279 | A | * | 1/1974 | Dempsey et al. ........... 219/751 |
| 4,015,183 | A | | 3/1977 | Miyakita |
| 4,075,792 | A | * | 2/1978 | Schreiber ................... 451/26 |
| 4,091,698 | A | | 5/1978 | Obear et al. |
| 4,106,378 | A | * | 8/1978 | Kaiser ....................... 83/74 |
| 4,616,324 | A | | 10/1986 | Simmel |
| 4,644,832 | A | | 2/1987 | Smith |
| 4,780,654 | A | * | 10/1988 | Shoji et al. ................. 318/434 |
| 4,942,795 | A | * | 7/1990 | Linke et al. ................ 83/72 |
| 4,967,304 | A | | 10/1990 | Dougherty |
| 5,007,776 | A | * | 4/1991 | Shoji .......................... 408/6 |
| 5,225,754 | A | | 7/1993 | Eckersley |
| 5,349,337 | A | * | 9/1994 | McCormick ................ 340/680 |
| 5,353,188 | A | | 10/1994 | Hatakeyama |
| 5,365,812 | A | | 11/1994 | Harnden |
| 5,420,487 | A | | 5/1995 | Eckersley |
| 5,572,916 | A | * | 11/1996 | Takano ...................... 83/74 |
| 6,039,097 | A | * | 3/2000 | Kennedy et al. ............ 144/357 |
| 6,212,437 | B1 | * | 4/2001 | Harris ........................ 700/40 |
| 6,354,909 | B1 | | 3/2002 | Boucher et al. |
| 6,507,255 | B1 | | 1/2003 | Ennis et al. |
| 6,516,693 | B1 | | 2/2003 | Thiele et al. |
| 6,551,033 | B2 | * | 4/2003 | Kakino et al. ............. 408/9 |
| 6,556,405 | B2 | | 4/2003 | Sudou et al. |
| 2002/0079859 | A1 | | 6/2002 | Lumsden |
| 2003/0063900 | A1 | | 4/2003 | Wang et al. |
| 2003/0095367 | A1 | | 5/2003 | Mares et al. |
| 2004/0040426 | A1 | * | 3/2004 | Gass et al. ................. 83/62.1 |

* cited by examiner

*Primary Examiner*—Kenneth E. Peterson
(74) *Attorney, Agent, or Firm*—McNees Wallace & Nurick LLC

(57) ABSTRACT

The present invention discloses a method and apparatus for controlling the load on the blade of a steel-cutting saw A programmable logic controller senses the spindle motor load current and compares it with the desired optimum operating current. Variations in hardness of the steel member cause the spindle motor current to fluctuate. The advancement of the blade by an electric servomotor is controlled by the PLC. The PLC reduces the rate of advancement of the blade in response to increasing spindle current, thereby reducing the load on the blade. The blade speed is maintained constant by a variable frequency motor powering the spindle motor. The operator selects the blade speed from 3 to 85 RPM, which is maintained by the variable frequency drive. The feed rate is the variable that is controlled by the PLC, by which the load current of the spindle motor is maintained relatively constant.

12 Claims, 9 Drawing Sheets

METHOD OF CUTTING CARBON AND ALLOY STEEL

FIELD OF THE INVENTION

The disclosed invention relates to a method of cutting carbon and alloy steel, and more particularly, to a method of optimizing load on a saw blade, decreasing cutting-cycle time, extending saw blade life and interrupting overload conditions on saw blades using a programmable logic controller.

Computer Program Listing—Appendix on Compact Disk

The following is a computer program listing for the Appendix submitted on compact disc. The file listed in this Appendix and reproduced on compact disc is hereby incorporated by reference.
Date
Created Size Name
Sep. 5, 2003 511KB PLCPROG
1 File 522,445 bytes

BACKGROUND OF THE INVENTION

In the steel industry, large circular saws are commonly used for cutting steel blooms, billets and tubes in a variety of sizes and shapes. Carbon and alloy steel in particular present a harsh environment for saw blades. Saw blades for such cutting operations are expensive to replace. Significant time and attention is devoted to optimizing the life of the saw blades. Traditionally, manufacturers of saw blades for cutting carbon and alloy steels have recommended a constant blade speed (revolutions per minute or RPM) and feed rate (inches per minute or IPM), in order to achieve a constant chip load. A typical chip loading is 0.004 inch, meaning that every tooth on the blade takes a 0.004 "chip" from the workpiece. Depending on the manufacturer and the blade, a manufacturer will typically provide a chart specifying the RPM and IPM for a various grades of steel, which in theory produce the desired, or optimum, chip load. Notwithstanding these efforts by the blade manufacturers, inconsistencies continue to exist between the blade life, the cutting cycle time and production costs for different grades of steel.

The cycle time is defined as the amount of time to complete one cut for a given workpiece. For example, a twelve inch round bloom may take from 147 to 189 seconds to complete one cut under the normal recommended chip load. This is an important statistic in the production management, since higher cycle time, results in slower production. Buffer zones are filled with cut rounds to be processed in a hot mill, so that manufacturing harder grades of steel does not interrupt production on the hot mill. If cycle time does not remain predictably constant, costly interruptions and down time may result.

Maintaining constant cycle time does not solve the problem of optimizing blade life, however, since by maintaining both constant blade speed and feed rate (RPM and IPM) causes) variable loading on the blade due to other variables, particularly the grade or hardness of the steel. Thus there is a need for a method of optimizing the blade loading in order to minimize wear and stresses.

SUMMARY OF THE INVENTION

The present invention discloses an apparatus and method for cutting steel members, having a rotary drive means for rotating a cutting blade; feeder means for pivotally feeding said blade into and out of a cutting position through one or more of the steel members and sensing means for sensing a load current associated with said rotary drive means. Also, the apparatus includes control means for (i) adjusting the rate of the feeder means responsive to said sensing means to maintain a predetermined value of the load current drawn by the rotary drive means; and (ii) stopping said drive means instantly upon sensing a predetermined overload current drawn by the rotary drive means. An operator interface provides means for operator communication with the control means to permit manual entry of load current values for reference comparison.

The method of the present invention includes the following steps. The system is initialized through a programmable logic controller and associated interface modules. An operator manually or automatically inputs a minimum value for the load current. A maximum value is then automatically computed for the load current based upon the minimum value. A range of values greater than a minimum value and less than a maximum value for cutting feed rate is programmed into the PLC. Then an overload current value is programmed. The system detects whether a cutting cycle is in progress.

The PLC compares a feedback signal representing a value of load current with a preset minimum value for load current and i) if feedback is less than minimum load, increments the feed rate until it equals the maximum preset feed rate;

ii) if feedback is not less than minimum value for the load current, determines if the feedback signal is greater than the maximum value for the load current.

The feed rate is then decremented if the maximum value for the load current is exceeded.

The system repeats the steps beginning with sensing a cutting cycle in progress until the cutting cycle is no longer in progress. If at any time the feedback signal exceeds the level corresponding to the overload current value, the run command is immediately removed from the PLC to a spindle motor drive.

DETAILED DESCRIPTION OF THE INVENTION

Introduction

Figure 1:
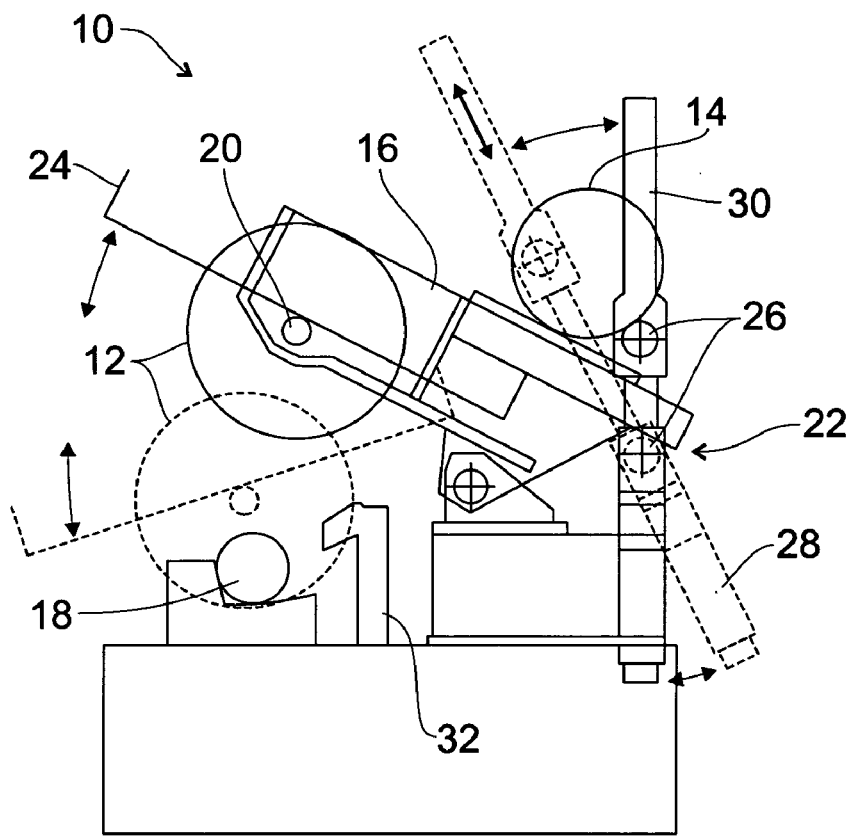
FIG. 1 is a schematic elevational view of a pivot-type cutting machine illustrating the movement of the blade.

The present invention discloses a method and apparatus for controlling the load on the blade or spindle motor of a steel-cutting saw for optimizing blade life, while at the same time reducing cutting cycle time and protecting the blade, gearbox and spindle hub from stresses caused by binding and jamming of the blade while cutting into a steel member. Using a programmable logic controller (PLC) to implement the method, the load current drawn by the spindle motor is sensed and compared to a reference value representing the desired optimum operating current. As the saw cuts through a steel member, variations in hardness cause the spindle motor current to fluctuate accordingly. The blade is advanced into the steel member by an electric servomotor. The rate of advancement of the blade is controlled by the PLC. As the current on the spindle motor increases, the PLC is programmed to reduce the rate of advancement of the blade, thereby reducing the load on the blade. The blade loading and spindle current are directly proportional. The rotational speed (RPM) of the blade is also maintained constant by a variable frequency motor drive that powers the spindle motor. The PLC does not vary the RPM of the blade. The operator selects the blade speed as a value in the range from 3 to 85 RPM, which is the reference value maintained by the variable frequency drive. The feed rate is the variable that is controlled by the PLC, by which the load current of the spindle motor is maintained relatively constant.

In some instances, the load current will not be reduced by the manipulation of the feed rate, typically due to binding of the blade caused by metal flex or other mechanical stresses. When such an event occurs, PLC adjusts the feed rate and the rotational speed of the blade to preset minimum values, but the spindle current continues to increase. The PLC also compares the current to a preset maximum value, normally around eighty percent of full load amps of the spindle motor. Upon reaching the preset maximum, the PLC removes the run command signal to the variable frequency drive, causing the spindle motor to stop abruptly. Response time for clearing an overload condition is approximately 10 milliseconds, or one-tenth of the time required to clear the overload using conventional analog current sensing and shut-off devices.

By maintaining the load constant and providing rapid overcurrent clearance, the inventor has been able to increase the total number of cuts that can be obtained from a blade, on average, and reduce the cycle time for cutting steel members. Use of this method thereby reduced operating costs associated with replacement blades and simultaneously increased production due to the shorter cycle time for an average cut.

This method and apparatus is not limited to the cutting of steel members, and one skilled in the art will readily appreciate that the present invention may be practiced on industrial metal products such as aluminum and other structural metals.

General Description of Saw

Referring to FIG. 1, a pivot-type cutting machine 10 is used in the production of industrial carbon and alloy steel. The machine uses carbide saw blade 12, typically 24 inches to 40 inches in diameter, to cut steel members—blooms, billets or other shapes—up to 14 inches in diameter. The cutting speed ranges from 3 to 85 revolutions per minute (RPM) and a feed rate from 0 to 40 inches per minute (IPM).

It should be noted that the size and speed range are set forth by way of example and not limitation, so that it is within the scope of the present invention to employ parameters more or less than those specifically set forth herein. Motor 14 drives gearbox 16 to turn blade 12 for cutting bloom 18. Blade 12 is attached to spindle 20. Spindle 20 is driven by gearbox 16, at a reduced RPM from that of the motor 14. A round bloom 18 is clamped into position in by clamping device 32, to be cut to length. The rotating blade 12 is then pivotally rotated into contact with bloom 18 until cutting begins. The cutting assembly 22, comprising the spindle motor 14, gearbox 16, blade 12 and blade guard 24 are movable about pivot point 26. Feed motor 28 drives a roller ball screw 30 causing the cutting assembly 22 to rotate, thus feeding the blade into the steel member 18.

Figure 2:
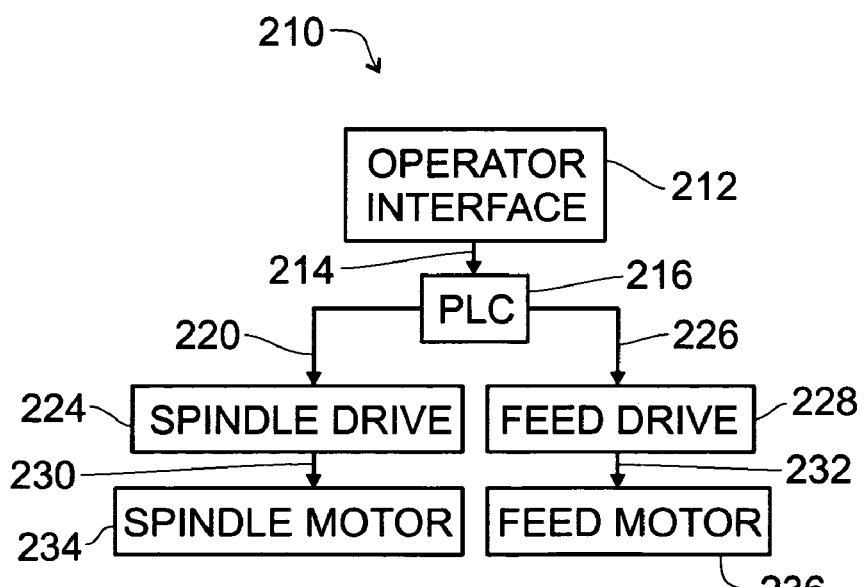
FIG. 2 is a schematic diagram of the control system.
Figure 3:
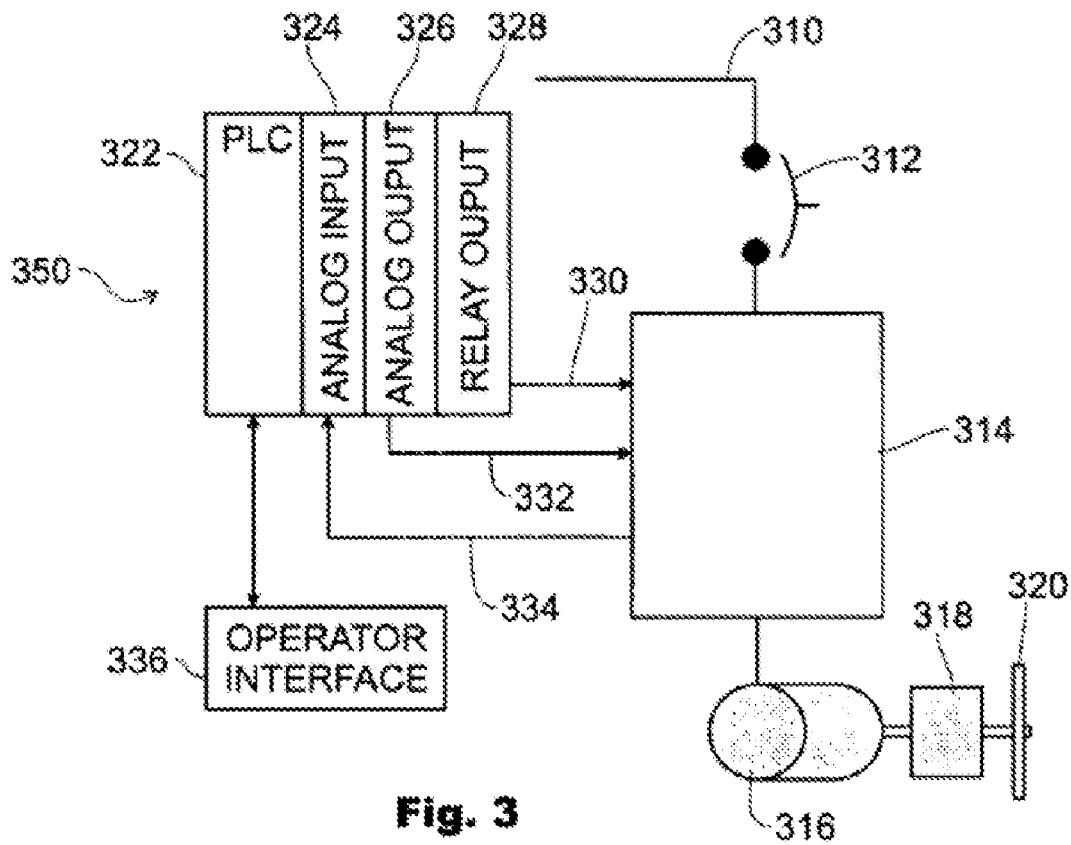
FIG. 3 is a schematic diagram of the spindle motor control system.

Referring next to FIGS. 2 and 3, a schematic diagram of the control system is generally designated as 210. An operator interface 212 communicates with PLC 216 through a bi-directional signal cable 214. PLC 216 communicates with spindle drive 224 through bi-directional signal cable 220, and with feed drive 228 through another bi-directional signal cable 226. Spindle drive 224 controls the speed of spindle motor 234 through power cable 230, according to the instructions communicated from PLC 216. Feed drive 228 controls the speed and rotation of feed motor 236 through power cable 232.

A schematic diagram of the cutting machine spindle control system is shown in FIG. 3. Power lines 310 feed 3-phase AC power to a variable frequency-type (VF) drive 314 through circuit breaker 312. Drive 314 maintains a constant speed on motor 316. Drive 314 is controlled through PLC 350. PLC 350 includes an internal logic processor module 322, one or more analog input modules 324, one or more analog output modules 326, and one or more relay output modules 328. Based upon a ladder logic program loaded into the logic processor module 322, relay output module 328 transmits a RUN command to VF drive 314 via signal cable 330 when the cutting cycle is initiated and all parameters are within acceptable ranges. Upon detecting a RUN command, drive 314 starts motor 316 which is mechanically coupled to gear box 318 to which saw blade 320 is attached. The motor rotational speed is selected by the operator through operator interface 336. Analog output module 326 transmits an analog reference signal (0–10 volts DC) to a speed reference input on VF drive 314. The analog reference signal is scaled to account for the speed reduction gear box 318. The maximum reference signal value (10 VDC) corresponds to a spindle/blade rotational speed, which in the disclosed embodiment corresponds to 85 RPM. The mid-range reference signal value (5 VDC) corresponds to a spindle/blade rotational speed of 42.5 RPM, or one half of the maximum speed. The VF drive 314 maintains constant rotational speed on motor 316 for the selected speed reference.

Description of Load Control

In the disclosed embodiment of the invention, the optimum spindle motor load was determined to be in the range of thirty to thirty-five percent of full load, based on experimental research and review of statistical data tracking three different industrial saws. When the RPM of the motor/blade, and the IPM of the feeder are set so as to maintain the spindle load current (or blade load) within this range, blade life is maximized and cut-cycle time is minimized.

The operator sets the desired RPM of the blade and minimum feed rate (IPM) through the operator interface module. Feed rate is selected as a minimum reference value.

Also, the operator sets a minimum value for the spindle current. A maximum spindle current value is then computed by the PLC at 5% above the minimum value as maximum reference value.

When the system is initialized in this way, the operator may then start the cutting cycle. Initially, the spindle motor maintains a constant RPM, and the feed rate is set to the minimum IPM reference value. The spindle current is continuously monitored and compared to the minimum and maximum reference values. If the spindle current is less than the set minimum value, the feed rate is increased by a signal to the servomotor. If the spindle current exceeds the set maximum value, the IPM is decreased until the spindle current drops below the set maximum value. The IPM is thus continuously adjusted in response to the level of the feedback signal representing the actual spindle motor load current.

The following is an example of how the system operates:

The operator inputs an Overload Setting of 80% of full load amps (FLA) and a Minimum Load of 25% of FLA. The PLC automatically calculates a Maximum Load of 5% more or 30%. Minimum Load=25% and Maximum Load=30%. Now the operator enters a Minimum IPM of 3.0. The cut cycle begins with the IPM at 3.0. The PLC increments the IPM until the cutting load is at least equal to the Minimum Load of 25%. The IPM value may be equal to 12.0 by this time. Cutting the round steel, the surface area being cut is increasing as the blade advances through the cut (like cutting logs with a chain saw, more area to cut in the middle of the log.) thus increases the load on the blade. If the cutting load value exceeds the Maximum Load of 30%, the PLC decreases the IPM until the cutting load is less than the Maximum Load of 30%. The IPM value could be any value below 12.0 at this point but the PLC is programmed to never go below the Minimum IPM of 3.0 in this example. If the cutting load decreases below the Minimum Load of 25%, the PLC increments the IPM until the cutting load is at least equal to the Minimum Load of 25%. This process is continuous throughout the cut.

if the PLC decreased the IPM to the Minimum 3.0, because the cutting load is greater the Maximum Load of 30%, the cutting load would be considered operating above the optimum parameters, indicating to the operator that the blade needs to be changed soon. If the blade were to continue cutting additional blooms, the cutting load would continue to exceed the Maximum Load of 30%. Additional cuts even could cause the cutting load to equal the Overload Value of 80%, shutting down the saw. At any time in normal mode or Load Control mode of cutting, if the cutting load exceeds the Overload Value of 80% the saw will shut down.

Overload Protection

Figure 4:
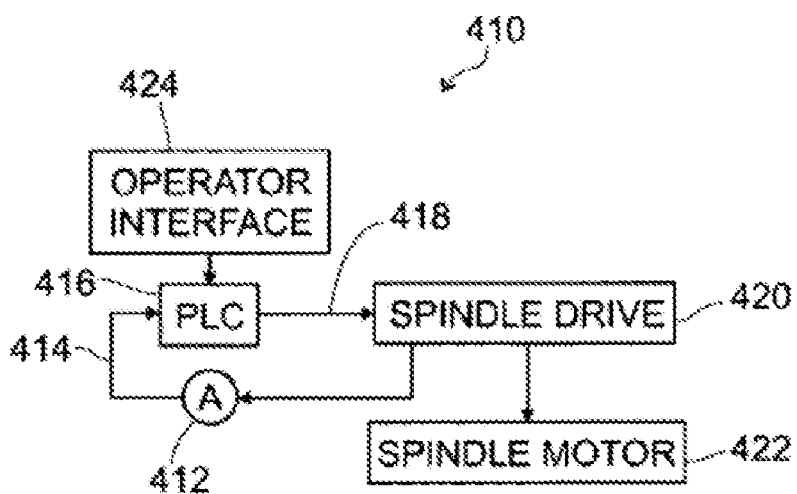
FIG. 4 is a diagram of the prior art overload protection control schematic.

The preferred embodiment of the present invention also includes an overload protection feature implemented through the PLC. As the cutting machine is processing the cutting cycle, spindle current is continuously compared to a preset overload value, typically between 75% and 100%, and preferably 80% percent of the full load amps of the spindle motor. This value is not an overload with respect to the current drawn by the motor, which is rated to run at 100% of FLA, but is a preventive indicator that the blade/spindle motor are experiencing a mechanical load that will likely lead to an overload if not immediately cleared. In that sense, the 80% value anticipates an actual overload condition before it occurs. Referring next to FIG. 4, for illustration purposes, a simplified schematic diagram of a prior art spindle current feedback system is generally designated as 410. An analog meter 412 measures the spindle current, and sends a signal to the PLC 416 if the metered value exceeds a preset maximum value. The PLC 416 in response to the signal 414 from the analog meter 412 sends a signal 418 to spindle drive 420 to turn off the spindle drive 422. The shut down time of the prior art overload clearance is in excess of 100 milliseconds. Operator interface 424 is connected to PLC 416 for inputting initial parameters.

Figure 5:
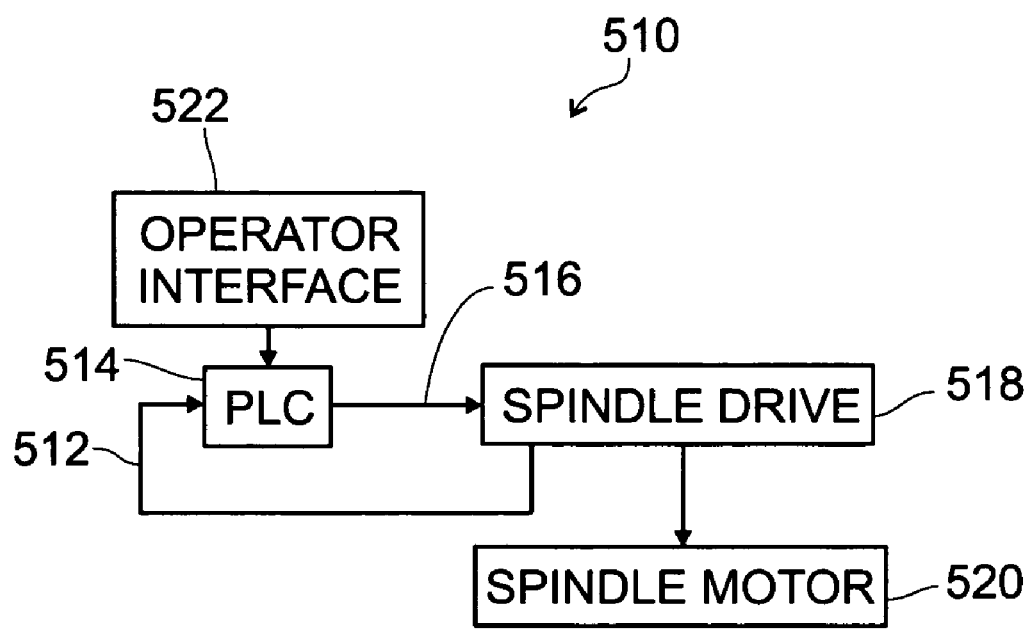
FIG. 5 is a diagram of the overload protection control schematic of the present invention.

Referring next to FIG. 5, the present invention features a direct feedback signal 512 from the spindle drive 518 indicating the current drawn by the spindle motor 520. The spindle drive signal ranges from 0 to 10 volts DC, representing 0 to 100% of the full load rating of the spindle motor 520. The PLC 514 converts the 0 to 10 volt analog signal 512 into a digital value from 0 to 32,000, allowing the PLC 514 to sense and respond to a wide range of conditions, including current spikes or a rapid increase in current. Increases in spindle current occur when the rotor of spindle motor 520 becomes locked because of a blade binding in a cut. The direct connection between the spindle drive analog output signal and the PLC eliminates the lag time presented by the analog meter of the prior art, thus permitting overload clearance time to be reduced to 10 milliseconds. The difference in time of at least 90 milliseconds is the amount of time under which the blade would previously have been subjected to high mechanical stress. In addition to reducing stress on the blade associated with binding, there is a lower incidence of shear pins and hubs, which are additional machine parts that become worn or broken when a blade binds in a cut.

Charts

Figure 6:
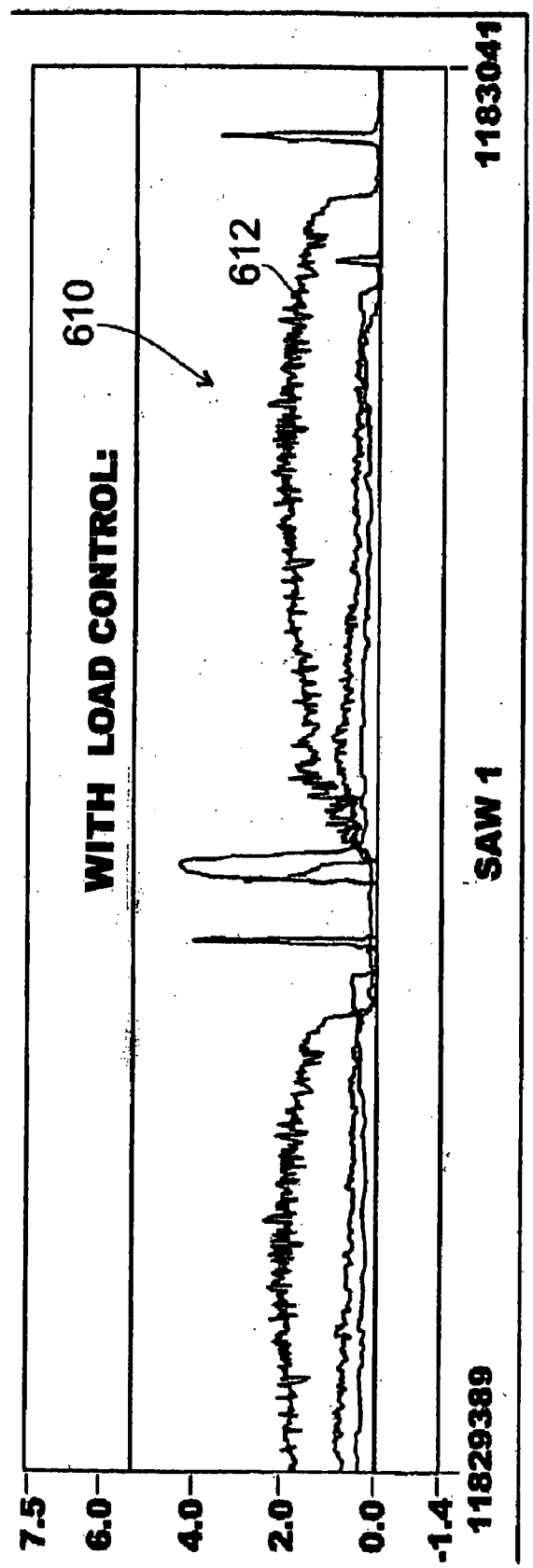
FIG. 6 is an analog screen trace of the load current profile using load control.
Figure 7:
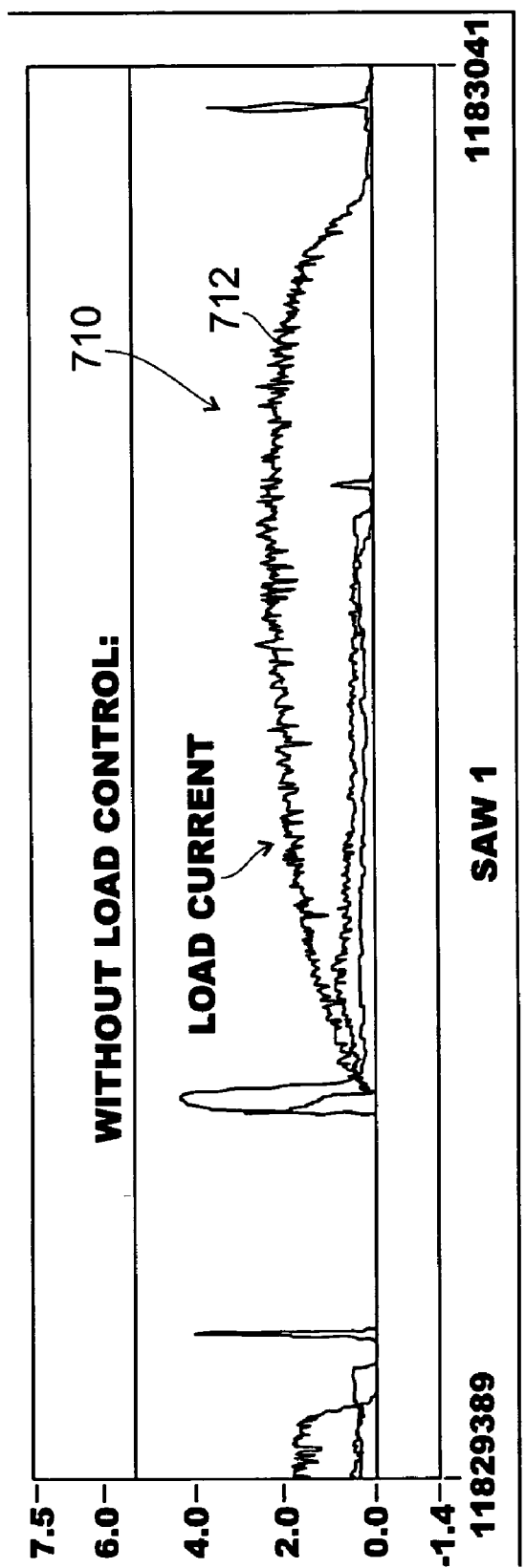
FIG. 7 is an analog screen trace of the load current profile using normal mode control.

Referring next to FIGS. 6 and 7, analog charts illustrate recordings of the differences measured between a saw cut using the method of the present invention, and another cut made without load control. In FIG. 6, the load control method was employed on Saw No. 1. The cycle time for the cut was 151 seconds. The profile 612 on the top tracer generally designated as 610 illustrates a relatively constant spindle current. By way of comparison, FIG. 7 illustrates a recording of a cut made without the use of the load control method. The cycle time for this cut was 180 seconds. The same saw was used and the steel members were equivalent size and grade of steel. The parabolic profile 712 shows a gradually increasing load current on the spindle, through approximately three-quarters of the cycle, then a less gradual decrease to the end of the cut. The greater cycle time, the variations in load, and the higher maximum load result in greater wear and tear on the blade and faster degradation of the saw blade when load control is not employed.

Figure 9:
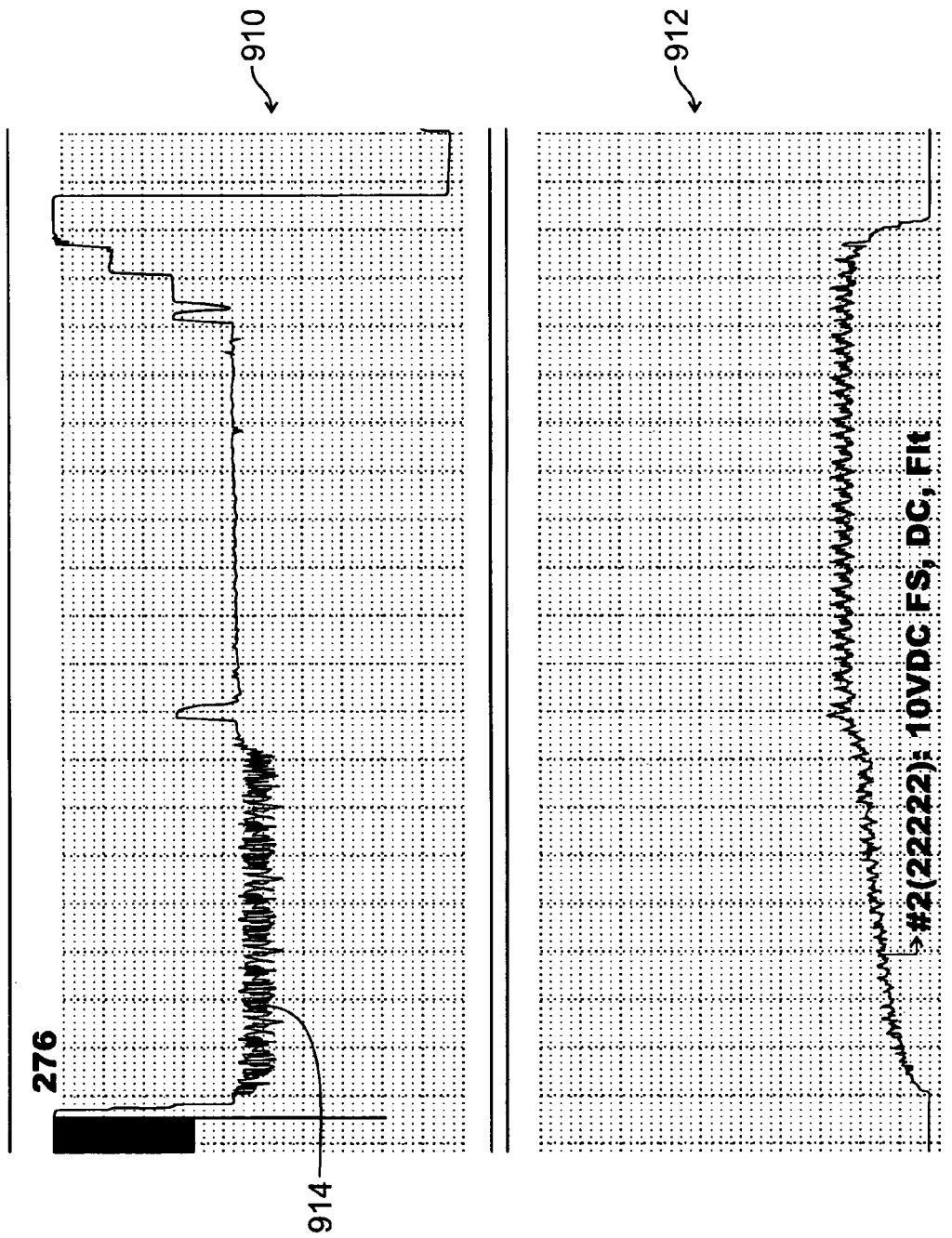
FIG. 9 is a chart of the feed rate and spindle load with fast response time.
Figure 10:
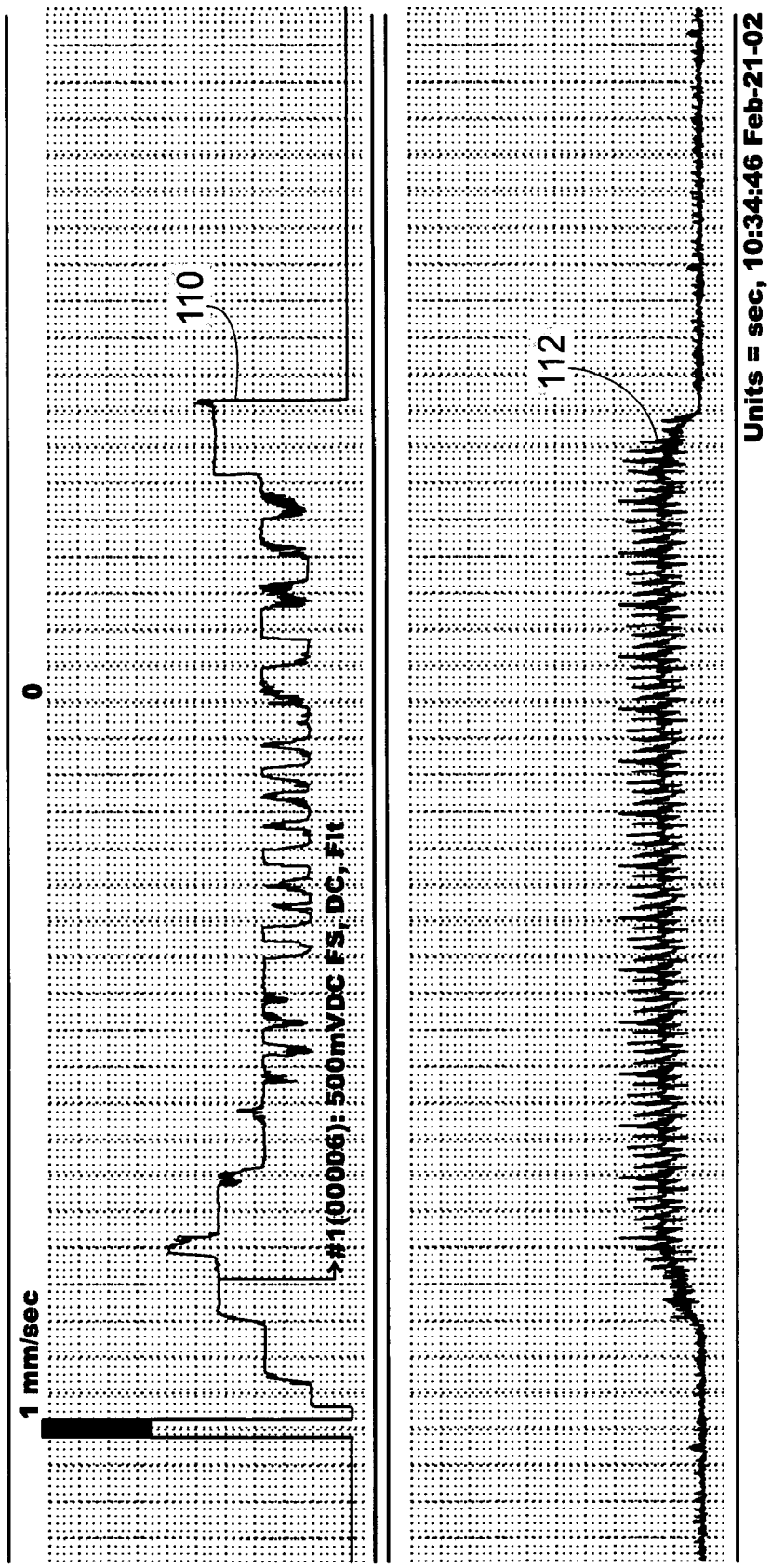
FIG. 10 is a chart of the feed rate and spindle load with narrow margins.
Figure 11:
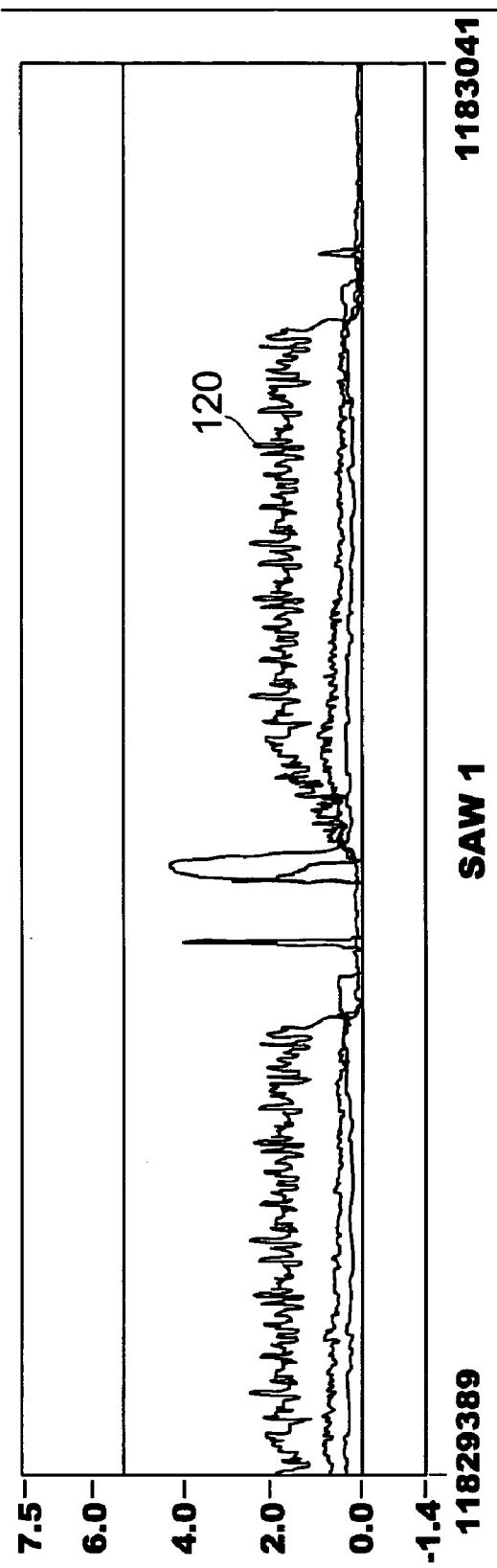
FIG. 11 is a chart of the feed rate and spindle load optimized for response time and margins

FIGS. 9 through 11 show examples of different adjustment rates used in the present invention. FIG. 11 shows a smooth curve 120 for feedrate in IPM, when the auto ramp function in the ladder logic diagram is adjusted in one-second intervals. FIG. 9 illustrates the feedrate 910 and the spindle load current 912. In this example, the adjustment rate was set at less than 1 second, and the system instability is apparent from the thick line 914 representing rapidly fluctuating feedrate signal for approximately 40% of the cutting cycle, while the system attempts to regulate the spindle load in the constant range.

FIG. 10 shows an example with the IPM window too narrow meaning the adjustment rate was greater than one second. The feedrate in IPM is shown on the top graph 110, and the spindle load current on the bottom graph 112. The load is erratic.

Preferably, the auto ramp is adjusted in one-second intervals, providing an optimal response time, and steadier tracking and adjustment of the spindle current.

Data Capture and Logging

An additional feature of the present invention is the logging of data to a host computer to create an historical database for tracking blade life, cycle time, and other performance indicia. Each saw PLC logs data to a host computer and contains the following:

a) Saw ID—(if data is recorded from more than one saw)
b) RPM—Speed of the saw blade
c) IPM—Feed rate of the saw blade.
d) Minimum Load—In LOAD CONTROL mode, the minimum blade load.
e) Peak Load—Maximum load that occurred during the cut cycle
f) Cycle Time—Time elapsed in seconds for the cut cycle
g) Date/Time—Date and time the cut was complete Over 150,000 saw cuts have been logged. Data shows the performance of each saw and indicates that load control mode is more productive than normal mode of operation. Table No. 1 shows an example of the data logged for each saw. In this example, Saw No. 1 made a total of 1926 cuts. 76 were in normal mode, 1850 in load control mode. The average cycle time in normal mode was 195 seconds, in load control mode, Cycle time was 118 seconds. On average 77 seconds per cut is reduced by using load control. Similar results are also shown on saw 2 and saw 3. The invention of this method clearly shows it is a better mode of operation.

Table No. 2 includes a sample of the actual data stored from the PLC.

TABLE NO. 2

SYSTEMS SAW DATA

| SAW | RPM | IPM | PEAK LOAD | MAX LOAD | FAST ADV | CYCLE TIME |
|---|---|---|---|---|---|---|
| 3 | 38.0 | 6.0 | 36.0 | 24 | 24 | 171 |
| 3 | 38.0 | 8.0 | 37.5 | 24 | 24 | 178 |
| 3 | 38.0 | 7.5 | 40.0 | 24 | 10 | 149 |
| 2 | 42.0 | 6.4 | 51.1 | 24 | 33 | 193 |
| 2 | 42.0 | 5.9 | 50.8 | 24 | 5 | 174 |
| 1 | 44.0 | 9.7 | 41.3 | 28 | 19 | 118 |
| 1 | 44.0 | 9.7 | 38.4 | 28 | 19 | 117 |
| 3 | 38.0 | 7.8 | 36.6 | 24 | 10 | 154 |
| 3 | 38.0 | 7.0 | 41.5 | 24 | 10 | 153 |
| 3 | 38.0 | 7.5 | 38.0 | 24 | 10 | 148 |
| 1 | 42.0 | 9.1 | 39.4 | 28 | 19 | 123 |
| 2 | 42.0 | 5.9 | 53.4 | 24 | 5 | 162 |
| 3 | 38.0 | 7.2 | 37.3 | 24 | 10 | 147 |
| 1 | 42.0 | 9.1 | 41.7 | 28 | 19 | 127 |
| 2 | 42.0 | 5.6 | 47.9 | 24 | 5 | 165 |
| 1 | 42.0 | 9.3 | 39.3 | 28 | 19 | 121 |
| 3 | 38.0 | 7.4 | 41.5 | 24 | 10 | 146 |
| 2 | 42.0 | 6.0 | 49.5 | 24 | 5 | 163 |

Table No. 3 is an example of actual saw blade reports for Saw No. 1 combined with logged saw cut data. Normal cut mode was used for the first test period, and load control was used for a comparable test period.

TABLE NO. 3

| Start Date | End Date | Total Cuts | Total Blades | Average Cuts Per Blade | Average Load | Average Cycle Time |
|---|---|---|---|---|---|---|
| Apr. 9, 2001 | Apr. 20, 2001 | 3298 | 30 | 110 | 41.5 | 136 |
| Apr. 23, 2001 | May 11, 2001 | 3444 | 28 | 123 | 42.0 | 118 |

TABLE NO. 1

SAW DATA

| | LOGGED CUTS | | | LOAD AVERAGE | | CYCLE TIME AVERAGE | | |
|---|---|---|---|---|---|---|---|---|
| | Normal | Load | Cuts | Auto | Avg. | Normal | Auto | Avg. |
| Saw 1 | 76 | 1850 | 1926 | 44.7 | 48.0 | 46.4 | 195 | 118 | 121 |
| Saw 2 | 350 | 1244 | 1594 | 46.7 | 45.0 | 45.9 | 146 | 136 | 138 |
| Saw 3 | 16 | 1624 | 1640 | 54.2 | 49.8 | 52.0 | 153 | 131 | 131 |
| Total | 442 | 4718 | 5160 | | | +− | | | |

Tables 4, 5 and 6 below show comparisons of normal mode operation vs. the load control of the present invention, for three different saws. There is a clear reduction in the average cutting cycle time between the two modes or methods of operation, and the present invention results in reduced average cutting cycle times from 26 to as much as 48 seconds. For normal mode operation, the average cutting cycle times fell between 164 seconds to 172 seconds. The load control method yielded average cutting cycle times between 119 seconds and 138 seconds.

TABLE NO. 4

Normal vs. LOAD CONTROL

| SAW No. | | TOTAL CUTS | MODE USED | AVG RPM | AVG IPM | AVG LOAD | AVG MAX |
|---|---|---|---|---|---|---|---|
| 1 | NORM | 306 | 5.0% | 41 | 2.6 | 43.0 | 80 |
|   | AUTO | 5779 | 95.0% | 42 | 7.3 | 45.1 | 29 |
|   | TOTAL | 6085 | | REDUCED CYCLE TIME | | | |

TABLE NO. 5

Normal vs. LOAD CONTROL

| SAW No. | | TOTAL CUTS | MODE USED | AVG RPM | AVG IPM | AVG LOAD | AVG MAX | AVG CYCLE |
|---|---|---|---|---|---|---|---|---|
| 2 | NORM | 792 | 15.2% | 40 | 2.9 | 44.6 | 80 | 172 |
|   | AUTO | 4435 | 84.8% | 40 | 7.1 | 45.6 | 26 | 136 |
|   | TOTAL | 5227 | | | | REDUCED CYCLE TIME | | 36 |

TABLE NO. 6

Normal vs. LOAD CONTROL

| SAW No. | | TOTAL CUTS | MODE USED | AVG RPM | AVG IPM | AVG LOAD | AVG MAX | AVG CYCLE |
|---|---|---|---|---|---|---|---|---|
| 3 | NORM | 222 | 4.3% | 41 | 2.9 | 44.8 | 80 | 164 |
|   | AUTO | 4947 | 95.7% | 39 | 6.6 | 47.2 | 26 | 138 |
|   | TOTAL | 5169 | | | | REDUCED CYCLE TIME | | 26 |

Method a) Also disclosed is a method according to the present invention, for optimizing cutting cycle time, minimizing blade wear, and preventing blade breakage, using a PLC to control and monitor the variables. The method of the present invention includes the following steps. The system is initialized through a programmable logic controller and associated interface modules. An operator manually or automatically inputs a minimum value for the load current. A maximum value is then automatically computed for the load current based upon the minimum value. A range of values greater than a minimum value and less than a maximum value for cutting feed rate, is programmed into the PLC. And then an overload current value is programmed. The system detects whether a cutting cycle in progress.

The PLC compares a feedback signal representing a value of load current with a preset minimum value for load current and i) if feedback is less than minimum load, increments the feed rate until it equals the maximum preset feed rate;
ii) if feedback is not less than minimum value for the load current, determines if the feedback signal is greater than the maximum value for the load current.

The feed rate is then decremented if the maximum value for the load current is exceeded.

The system repeats the steps beginning with sensing a cutting cycle in progress until the cutting cycle is no longer in progress. If at any time the feedback signal exceeds the level corresponding to the overload current value, the run command is immediately removed from the PLC to a spindle motor drive.

Figure 8:
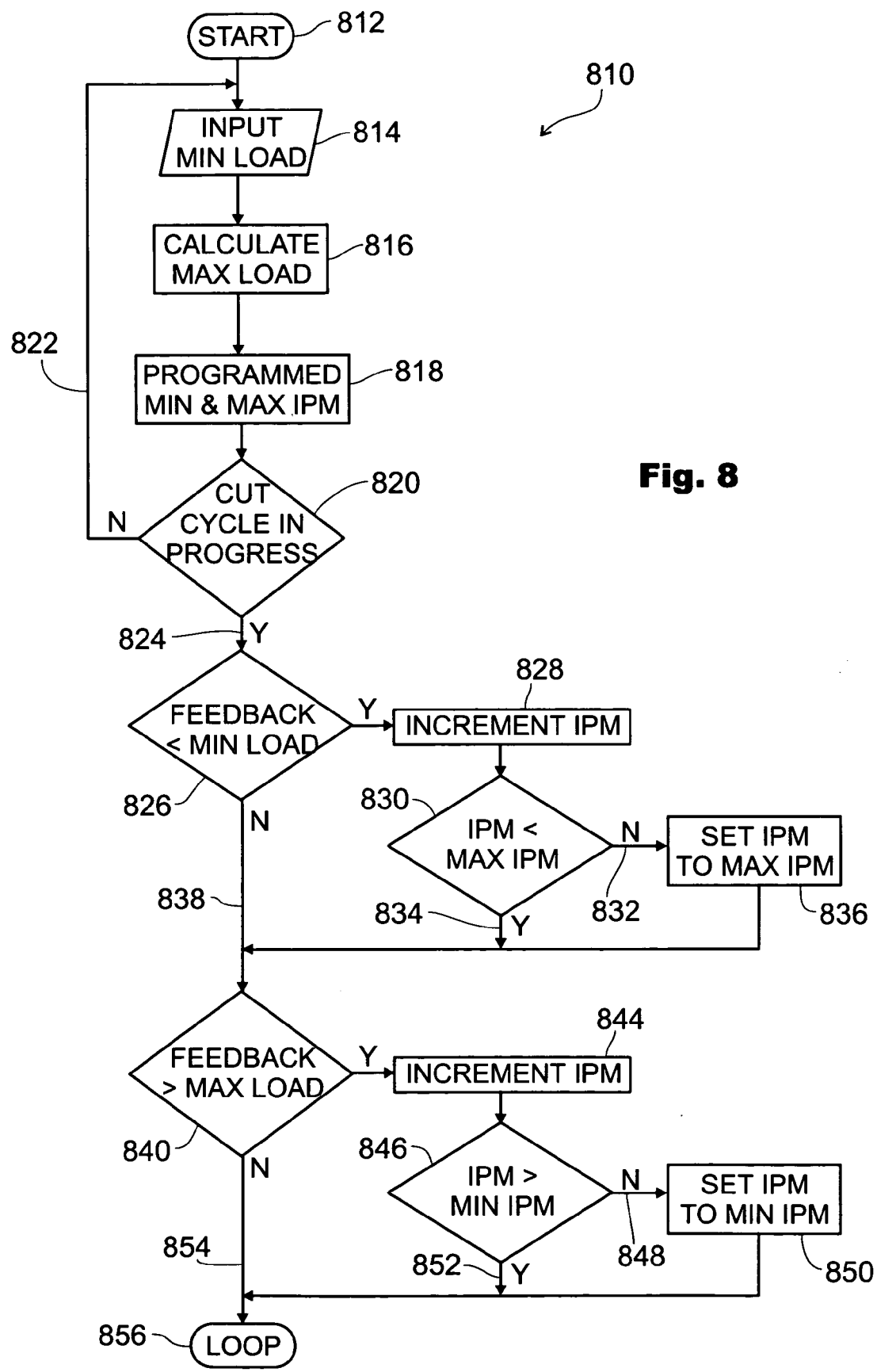
FIG. 8 is a flowchart for calculating feed rate.

Referring to FIG. 8, a flowchart diagram of the method for calculating and adjusting the feedrate is shown. At the Start signal 812, the user is prompted to enter an input value for the minimum load 814. This is typically 30% of the full load amps. The PLC then calculates the maximum load 816 automatically, usually at 35% of full load. Thus, the load is considered to be maintained relatively constant when the load current is maintained approximately between 30% and 35% of full load amps, with deviations above and below allowed for some overshoot in response lag time. The operator then also inputs the desired range of feedrate by selecting desired minimum and maximum values 818. Then the cut cycle is ready to begin when initiated by the operator 820, or returns the operator back to the initialization steps 822.

If the PLC senses that the cut cycle is in progress 824, the load feedback signal is compared with the minimum load value 826. If the load is less than the minimum reference value, the feedrate is incremented 828. The value for the feedrate is then compared to the maximum reference value of feedrate 830. If the feedrate (IPM) is not less that the maximum reference value 832, the PLC defaults to the maximum feedrate reference setting 836. If however, after incrementing the IPM, the value for the feed rate is less than the maximum 834, then the feed rate remains at the incremented value and returns to the main string 838.

In the next sequence, the feedback signal is compared to the maximum load. If the feedback signal does not exceed the maximum load 854, then the loop 856 repeats. The ladder subroutine executes once per scan interval of 10 milliseconds.

If at the comparator 840 the feedback signal indicates that the maximum load is exceeded 842, the PLC decrements the feed rate 844. The decremented feed rate is then compared with the minimum reference value for feed rate 846. If the decremented feed rate is not greater than the minimum reference value for feed rate 848, then the PLC sets the feed rate at the minimum reference value 850. If the load feedback signal does not exceed the maximum load at the feedback comparator 840, the loop 856 is repeated.

APPENDIX

Attached hereto as Appendix A is a complete logical ladder diagram for programming a General Electric Fanuc PLC to control a typical cutting machine, which in the disclosed embodiment is a metal cut carbide blade pivot-type cut-off machine manufactured by Centro-Metalcut, Inc.

According to the provisions of the patent statutes, I have explained the principle, preferred construction, and mode of operation of the invention, and have illustrated and described what I now consider to represent its best embodiments. However, it should be understood that within the scope of the appended claims and the foregoing description, the invention may be practiced, otherwise than specifically illustrated and described.

I claim:

1. An apparatus for cutting steel members comprising:
rotary drive means rotating a circular cutting blade, said rotary drive means having a first speed controller portion, a motor portion and a gearbox portion, the gearbox portion having a spindle portion attached to the circular cutting blade, and the speed controller portion configured to control a constant speed of the rotary drive means with a range of selectable speeds, feeder means for pivotally feeding said blade into and out of a cutting position through one of more of the steel members, the feeder means including a second speed controller portion and a motor portion for adjusting the feed rate;
sensing means for sensing a load current associated with said rotary drive means; and
control means for adjusting the rate of the feeder means with the second speed controller portion responsive to said sensing means to maintain a predetermined value of the load current drawn by the rotary drive means and for stopping said drive means instantly upon sensing a predetermined anticipated overload current of the full motor load drawn by the rotary drive means.

2. The apparatus as set forth in claim 1, also comprising operator interface means for operator communication with the control means to permit manual entry of load current values for reference comparison.

3. The apparatus as set forth in claim 1, wherein said feeder means further comprises a servo-motor, a pivot means, and a ball screw portion, said servo motor rotatably attached to said ball.

4. The apparatus as set forth in claim 1, wherein said sensing means comprises an analog to digital converter portion in electrical communication with an output signal from 0 to 10 volts corresponding to a range of load current values on said rotary drive means.

5. The apparatus as set forth in claim 1, wherein said control means comprises a programmable logic controller programmed to adjust the rate of the feeder by comparison to the value communicated by the sensing feeder means when the reference value associated with a preset load current, decreasing the rate of said feeder means when the reference value is exceeded by the value communicated by the sensing means and increasing the rate of said feeder means when the reference value is less than the value communicated by the sensing means.

6. The apparatus as set forth in claim 1, wherein the predetermined value of the load current is between 30% and 35% of the spindle motor full load rating.

7. The apparatus as set forth in claim 1, wherein the rotary drive means also being programmed to maintain a preselected constant rotational speed on the rotary drive means and cutting blade.

8. The apparatus as set forth in claim 7, wherein the preselected constant rotational speed is between 3 and 85 RPM.

9. The apparatus as set forth in claim 1, wherein the predetermined overload current is between 75% and 100% of full load.

10. The apparatus as set forth in claim 1, wherein the control means further comprises a programmable logic controller coupled to the sensing means, the programmable logic controller including a stored executable logic program, wherein the drive means is stopped by the programmable logic controller as a result of removing a run command within 10 milliseconds in response to the sensing means sensing the predetermined anticipated overload current value.

11. The apparatus as set forth in claim 1, wherein said speed controller portion comprises a variable frequency speed controller for the motor portion electrically coupled to said control means, said speed controller portion responsive to signals transmitted by said control means to maintain constant speed on said rotary drive means.

12. The apparatus as set forth in claim 1, wherein said apparatus also includes a data storage means for logging data associated with one or more cutting machines, wherein a plurality of data parameters are logged, said parameters being selected from the group including:
number of cuts, operation mode, spindle RPM, feed rate 1PM, running load, maximum load, and cutting cycles, averages, and combinations thereof; for a plurality of cutting cycles taken over any desired period of time.

* * * * *

UNITED STATES PATENT AND TRADEMARK OFFICE
CERTIFICATE OF CORRECTION

PATENT NO. : 7,178,436 B2 Page 1 of 1
APPLICATION NO. : 10/703264
DATED : February 20, 2007
INVENTOR(S) : Wilson It is certified that error appears in the above-identified patent and that said Letters Patent is hereby corrected as shown below:

Claim 12, Col. 12, Line 40: "1PM" should be --IPM--.

Signed and Sealed this

First Day of May, 2007

JON W. DUDAS
*Director of the United States Patent and Trademark Office*